United States Patent
Edwards

(10) Patent No.: US 6,539,501 B1
(45) Date of Patent: Mar. 25, 2003

(54) METHOD, SYSTEM, AND PROGRAM FOR LOGGING STATEMENTS TO MONITOR EXECUTION OF A PROGRAM

(75) Inventor: Jermaine Charles Edwards, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,853

(22) Filed: Dec. 16, 1999

(51) Int. Cl.⁷ ................................................. G06F 11/34
(52) U.S. Cl. ............................ 714/45; 714/38; 717/128
(58) Field of Search ....................... 714/38–45; 717/124, 717/127, 128–131

(56) References Cited

U.S. PATENT DOCUMENTS

| | | |
|---|---|---|
| 4,462,077 A | 7/1984 | York |
| 4,819,233 A | 4/1989 | Delucia et al. |
| 5,023,907 A | 6/1991 | Johnson et al. |
| 5,067,073 A | 11/1991 | Andrews |
| 5,121,489 A | 6/1992 | Andrews |
| 5,138,712 A | 8/1992 | Corbin |
| 5,274,811 A | 12/1993 | Borg et al. |
| 5,513,317 A | 4/1996 | Borchardt et al. |
| 5,579,222 A | 11/1996 | Bains et al. |
| 5,659,752 A | 8/1997 | Heisch et al. |
| 5,708,709 A | 1/1998 | Rose |
| 5,758,069 A | 5/1998 | Olsen |
| 5,765,152 A | 6/1998 | Erickson |
| 5,793,947 A | 8/1998 | Sakamoto |
| 5,857,102 A | 1/1999 | McChesney et al. |
| 5,892,939 A | 4/1999 | Call et al. |
| 5,925,127 A | 7/1999 | Ahmad |
| 6,139,198 A * | 10/2000 | Danforth et al. ............. 717/128 |
| 6,289,503 B1 * | 9/2001 | Berry et al. ................. 717/128 |

FOREIGN PATENT DOCUMENTS

JP      11003237      1/1999

OTHER PUBLICATIONS

U.S. patent application Ser. No. 09/210,104 filed Dec. 11, 1998.

* cited by examiner

Primary Examiner—Scott Baderman
(74) Attorney, Agent, or Firm—David W. Victor; Konrad Raynes Victor & Mann LLP

(57) ABSTRACT

Disclosed is a system, method, and program for generating trace statements to a log file. A log method in a program, such as a Java program, including an identifier parameter is processed. The program includes multiple instances of the log method to trace the execution of the program during debugging operations. A determination is made as to whether a variable indicates that log methods called with the identifier parameter should be processed. The class and method from which the log method was called is determined if the variable indicates that log methods called with the identifier parameter should be processed. Information on the identifier parameter and determined class and method are written to the log file.

30 Claims, 3 Drawing Sheets

METHOD, SYSTEM, AND PROGRAM FOR LOGGING STATEMENTS TO MONITOR EXECUTION OF A PROGRAM

BACKGROUND OF THE INVENTION

1. Field of the Invention

The present invention relates to a method, system, and program for generating statements while processing a program in a debugging mode to determine the execution path of the program.

2. Description of the Related Art

As part of the software development process, software developers must test and debug their programs. One technique for debugging a program is to intersperse coded statements, referred to as tracing statements, within the software. When the program is executed, the trace statements are generated as output. The software developer can then determine the paths of execution of the program by reviewing the trace statements that were outputted during execution. Some tracing methods operate by having a separate debugging program that monitors the operation of the target program, i.e., the program including the trace statements that is being debugged. This debugging program would be called each time a trace statement is referenced in the target program. However, such techniques can substantially degrade the performance of executing the target program as the debugging program interrupts the execution of the target program.

Although tracing methods for debugging programs are well known in the art, and described in U.S. Pat. No. 5,067,073, entitled "Embedded Tracing Method for Identifying Program Executed Paths," there is no specific tracing program for the Java computer language. Thus, there is a need in the art to provide efficient tracing programs for use in debugging Java programs, such as Java applets.

SUMMARY OF THE PREFERRED EMBODIMENTS

To overcome the limitations in the prior art described above, preferred embodiments disclose a system, method, and program for generating trace statements to a log file. A log method in a program including an identifier parameter is processed. The program includes multiple instances of the log method to trace the execution of the program during debugging operations. A determination is made as to whether a variable indicates that log methods called with the identifier parameter should be processed. The class and method from which the log method was called is determined if the variable indicates that log methods called with the identifier parameter should be processed. Information on the identifier parameter and determined class and method are written to the log file.

In further embodiments, the log method is processed by a thread executing the program. This thread determines whether the variable indicates that the processed log method should be processed and the class and method from which the log method was called.

Still further, the thread executing the program is executing in a first process. The thread calls a second process separate from the first process. This second process writes the trace statements to a buffer and periodically writes the trace statements from the buffer to the log file.

Yet further, the first process in which the program is executing is capable of simultaneously processing multiple log methods called from multiple threads executing in the first process. Each thread executing in the first process is capable of separately determining the class and method for each of the multiple log methods that are processed.

Preferred embodiments provide a technique for generating a trace log file for programs, such as Java programs, that simplify what is required of the software developer. With preferred embodiments, the software developer need only insert methods with a few parameters at different points within the program to monitor the path of execution of the program. Further, because in preferred embodiments a daemon in a separate process is writing the log statements to the log file, the operations of the logger daemon do not affect the execution of the program. For this reason, any failure or interruption in the execution of the program will not interfere with the logging operations of the separate logger daemon process.

Preferred embodiments are particularly suited for programming languages, such as Java, that do not include simplified tools for logging statements when debugging a program.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
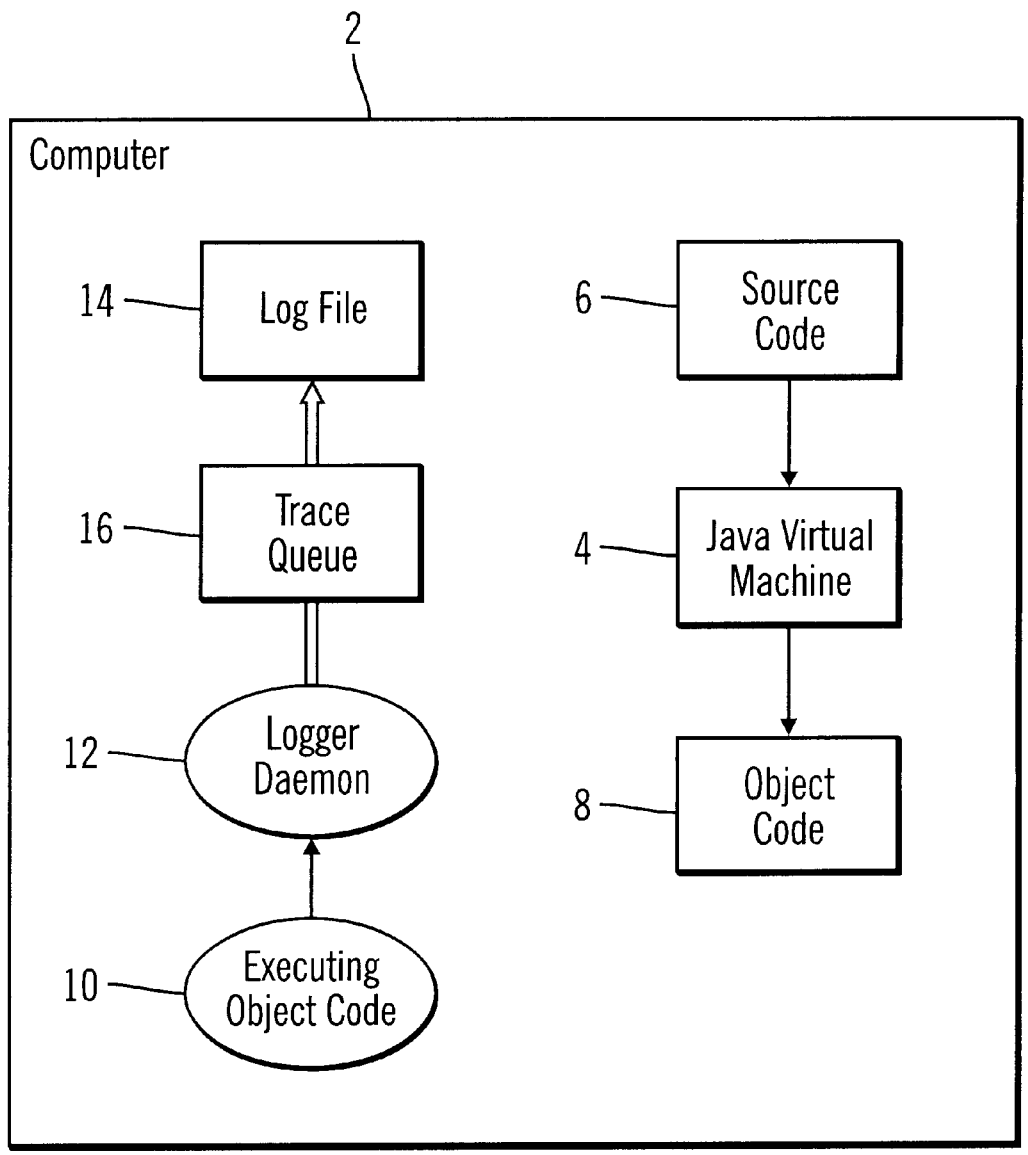
FIG. 1 is a block diagram illustrating a computing environment in which preferred embodiments of the present invention are implemented.

FIG. 1 illustrates a computing environment in which preferred embodiments are implemented. A computer 2, which may be any computing device known in the art, e.g., mainframe, desktop computer, laptop, hand held device, etc., includes a Java Virtual Machine 4 that converts a Java source code 6 file, such as a Java applet, into native object code 8 that is executable within the operating system installed on the computer 2. A thread executing the object code 10 comprises the actual execution of the object code 8. During execution of the object code 10, calls are made to a logger daemon 12 executing in the computer 2 executing in a process separate from the thread executing the object code 10.

For purposes of the discussion herein, a thread is an independent flow of control that operates within the same address space as other independent flows of controls. Multiple threads may be grouped into a single entity called a process. In a multiprocessor system, multiple threads can execute at the same time, one on each processor. There may be multiple processes executing, each including multiple threads. A process provides a common address space and common system resources, including file descriptors, signal actions, shared libraries, and inter-process communication tools (such as message queues, pipes, semaphores, or shared memory). The thread is the schedulable entity. It has only those properties that are required to ensure its independent flow of control.

The logger daemon 12 may write trace statements to a log file 14 in response to calls from the thread executing the object code 10 to handle log operations. In preferred embodiments, the thread executing the object code 10 would buffer gathered trace data into the trace queue 16 and the logger method 12 would write the trace statements to the log file 14. The software developer may later review the contents of the log file 14 for debugging purposes and to monitor the path of execution of the object code 10.

Figure 2:
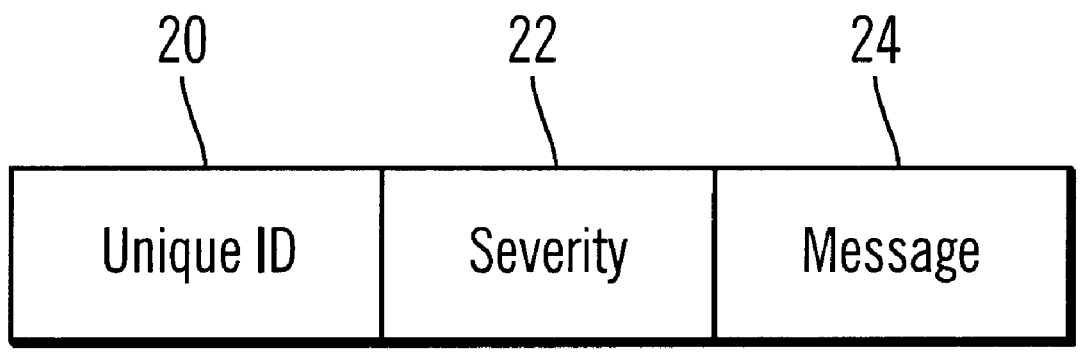
FIG. 2 illustrates parameters to use with a log method in accordance with preferred embodiments of the present invention.

In preferred embodiments, the user would insert one or more log methods into the source code 6 as trace statements to monitor the execution path of the source code 6. FIG. 2 illustrates an example of parameters that may be used with the log method trace statements. A unique ID 20 provides an identifier for a group of which the log method is associated. For instance, a Java applet program may be comprised of different components, each performing some particular defined function or category of functions within the applet. In such case, the software developer may assign a unique ID to each component of the applet, such that the log methods having the unique ID associated with a particular component would be used to trace the execution of those Java statements related to that particular component. A severity parameter 22 indicates whether the log method is for an error message, warning or information. For instance, if the software developer is inserting the log method trace statements into the source code 6 to debug an error, then the error severity level may be used. A message parameter 24 allows the user to specify a particular message to display in the log file 14.

The preferred log method statement provides a straightforward and easy-touse technique for a software developer to insert trace statements into the source code 6. Although the log method only requires three parameters that are readily specified, the log method calls are capable of causing even further trace information to be written to the log file 14, such as the class and method from which the log method trace was called. However, the software developer need not specify such additional information in the log method calls, as such information is determined by the logger daemon 12 during the process of executing the object code 10.

In preferred embodiments, the software developer would also specify two environmental variables to process the log method trace statements, a TraceOn and groupNumbers variables. TraceOn is a boolean value indicating whether the log method trace statements should be processed. The groupNumbers variable indicates the unique ID of log method trace statements that should be processed. In this way, the software developer can specify whether to even process log method calls and/or the group of log methods that will be considered.

During execution, execution of a log method will cause the thread executing the object code 10 to generate trace data and then call the logger daemon 12 to further handle the trace data. The logger daemon 12 is implemented in a JavaLogDaemon class. Below are methods and variables implemented by either the logger daemon 12 or thread executing the object code 10. variables:

TraceOn—is the value of the environmental variable indicating whether the log method statements should be processed.

groupNumbers—is the environmental variable indicating the group numbers or unique ID of log methods to process.

addToTraceOueue( ): writes trace statements to the trace queue 14.

getTraceGroup( ): gets the groupNumbers of the unique ID of the log methods to process.

printQueueInfo( ): writes queued trace data to the log file 14.

regst( ): is a boolean value indicating whether the unique ID of the called log method matches one of the groupNumbers.

getLogThreadGroup( ): obtains the thread id of the thread on which the log method calls the logger daemon 12.

getCallMethod( ): obtains the class and method name from the Java application from where the log method was called. This may be obtained by determining the thread from which the log method was called, because the log method would have been called from a particular class and method.

Figure 3:
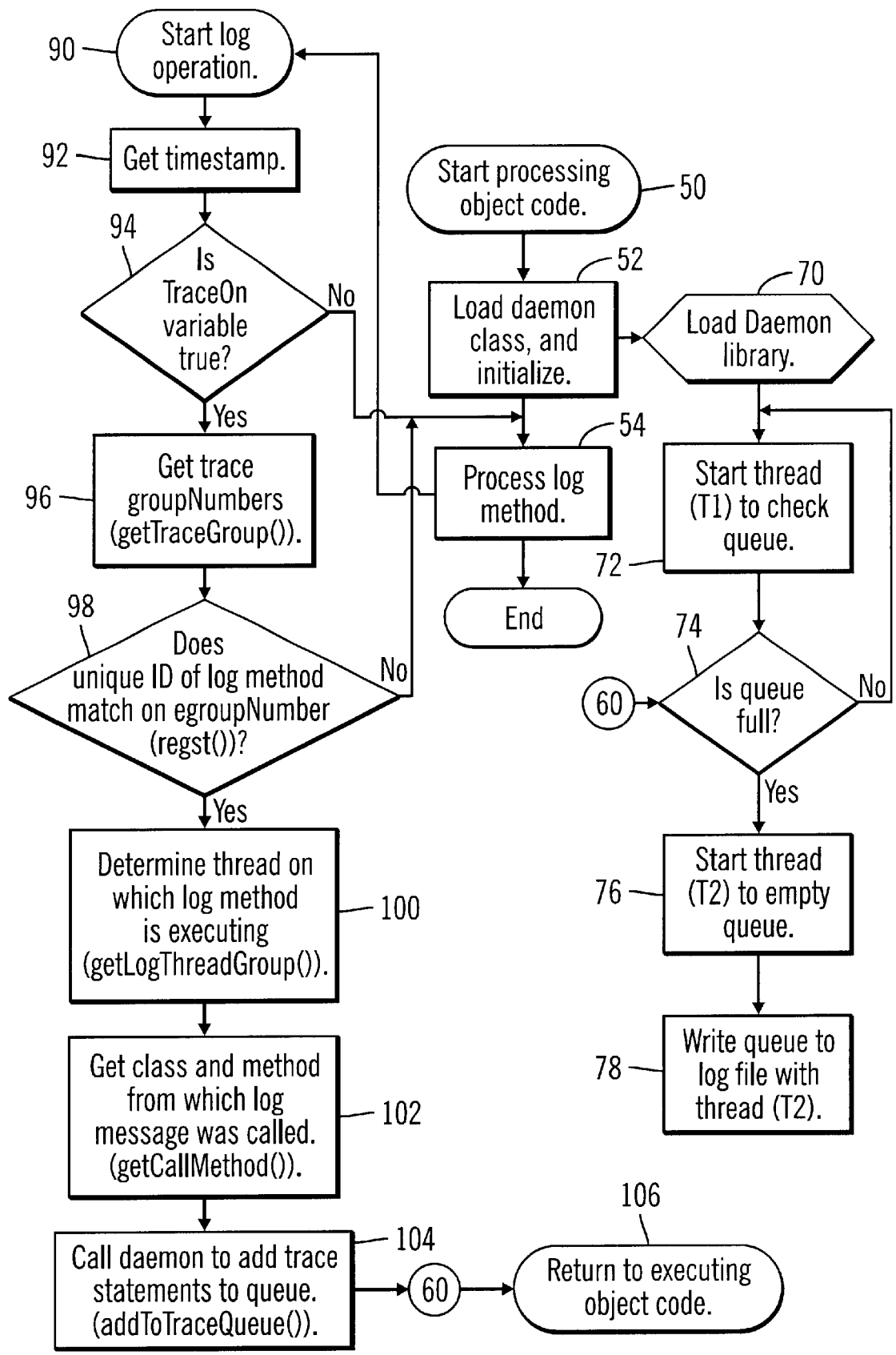
FIG. 3 illustrates logic implemented in a thread executing the object code and a logger daemon to generate log statements to a log file in accordance with the preferred embodiments of the present invention.

FIG. 3 illustrates logic implemented in the logger daemon 12 and thread executing the object code 10. Control begins at block 50 with the thread executing the object code loading (at block 52) a class to initialize the logger daemon 12 for trace statement processing. In response to loading the class to initialize the logger daemon 12 at block 52, the logger daemon 12 loads the logger daemon library (at block 70) and starts a thread (T1) (at block 72) to check the trace queue 16. The thread T1 then determines (at block 74) whether the queue is full. If so, the thread (T1) spawns (at block 76) thread (T2) to write the contents of the trace queue 16 to the log file 14. Thread (T2) writes (at block 78) the contents of the trace queue 16 to the log file 14.

From block 52, after invoking the logger daemon 12 at block 70, the thread executing the object code 10 processes a log method. The thread executing the object code 10 then begins a log operation at block 92. The thread executing the object code 10 would begin the steps at block 90 with the same thread that was executing the object code. This thread will obtain (at block 92) a current time stamp If the environmental trace variable (TraceOn) is false (at block 942), then the thread executing the object code 10 ends the thread. Otherwise, the groupNumbers of the unique IDs of log methods to process are obtained (at block 96). If the unique ID of the log method processed at block 54 has a unique ID parameter 20 matching one of the groupNumbers, i.e., regst( ) returns false (at block 98), then control returns to processing the object code 8. Otherwise, the thread executing the object code 10 determines (at block 100) its thread ID and then determines (at block 102) its class and method.

In preferred embodiments, the user defined group number is converted to the Unique ID using right shift conversion. All the group numbers are then packed by a power of two into an integer string using packing techniques known the art. The method regst( ) operates by converting the unique ID of the called log method into the original group number and then tests to see if the group number is included in the packing of all the group numbers. Packing the group numbers allows for a large number of group numbers to be maintained in memory without consuming a significant portion of memory as packing data optimizes space usage. Further, the process of comparing the unique ID against the packed group numbers is very fast, thereby reducing the time the thread executing the object code 10 spends processing log statement related operations.

The thread executing the object code 10 will then call the logger daemon 12 to add the trace statements to the queue 14, including the unique ID, severity, class and method information from which the log method was called, and time stamp. The logger daemon 12 is notified at block 60 to again check the trace queue 16. Control then returns at block 106 to executing the object code 8.

Preferred embodiments provide a simplified tool to allow the Java software developer to generate trace statements from a Java program. All the Java software developer must do is place log method statements including a few parameters at different point in the Java source code. As discussed, the software developer may divide the log method statements into groups according to the components within the Java source code 6. If the developer decides to activate the tracing function, i.e., TraceOn, and the particular group, then a separate logger daemon 12 executing independently of the thread executing the object code 10 will spawn a thread to monitor the trace queue 16 and write trace statements to the log file 14.

The logger daemon 12 may identify the log file by the process ID of the process executing the Java object code 8 from which the log method calls were processed.

In preferred embodiments, the logger daemon 12 operates in an entirely separate process from the thread executing the object code 10. The only interaction between the thread executing the object code 10 and logger daemon 12 is when the thread executing the object code 10 calls the logger daemon 12 to take over handling of the trace statements. However, the logger daemon 12 immediately spawns a new thread to process the log statements and immediately releases control of the thread executing the object code 10 to allow the thread 10 to return to executing further object code 8. This ensures that the trace statement processing operations performed by the logger daemon 12 will not interfere with or affect the performance of the executing object code process 10 and that the thread 10 will not have to spend time away from executing the object code 8 to manage the trace queue 16 and log file 14.

Moreover, because a separate daemon 12 is managing the trace queue 16, the daemon 12 can handle calls from multiple threads spawned from the thread executing the object code 10. For each thread processing a log method call, the logger daemon 12 would spawn an additional thread to process the trace statements. Because the logger daemon 12 is a separate process from the thread executing the object code 10, a failure or abrupt termination of the thread executing the object code 10 due to a crash or user intervention will not interfere with writing the trace statements to the log file 14 as the logger daemon 12 would not be affected by a failure of the separate thread executing the object code 10. Instead, after the thread executing the object code 10 terminates, the logger daemon 12 could continue to complete adding log statements to the trace queue 16 and writing log statements in the trace queue 16 to the log file 14. Thus, implementing the methods within a separate logger daemon 12 class allows multiple log method calls from different threads to be processed simultaneously without interfering with the thread executing the object code 10.

Still further, with the preferred embodiments, trace statements including important information are generated and written to the log file 14 with minimal user involvement. All the user must do is insert the log method calls having only a few parameters at locations within the source code. Preferred embodiments thus provide an improved technique for generating trace statements for use in debugging Java programs, such as Java applets.

Conclusions and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments were described with respect to generating trace statements for programs written in the Java programming language, such as Java applets. However, the techniques of the preferred embodiments may apply to language environments other than Java.

Preferred embodiments described the steps of FIG. 3 as occurring in a particular order. However, in alternative embodiments the order of the steps may be modified and steps may be added or removed in accordance with the preferred embodiments of the present invention.

In summary, preferred embodiments disclose a system, method, and program for generating trace statements to a log file. A log method in a program including an identifier parameter is processed. The program includes multiple instances of the log method to trace the execution of the program during debugging operations. A determination is made as to whether a variable indicates that log methods called with the identifier parameter should be processed. The class and method from which the log method was called is determined if the variable indicates that log methods called with the identifier parameter should be processed. Information on the identifier parameter and determined class and method are written to the log file.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating trace statements to a log file, comprising:

processing a log method in a program including an identifier parameter, wherein the program includes multiple instances of the log method to trace the execution of the program during debugging operations;

determining whether a variable indicates that log methods called with the identifier parameter should be processed;

determining a class and method from which the log method was called if the variable indicates that log methods called with the identifier parameter should be processed; and writing trace statements including information on the identifier parameter and determined class and method to the log file.

2. The method of claim 1, wherein the identifier indicates a component of the program from which the log method is called.

3. The method of claim 1, wherein the log method is called with a severity parameter indicating a purpose of the call.

4. The method of claim 1, further comprising:

processing group numbers packed by a power of two into a string to determine whether a group number associated with the identifier parameter is included in the string, wherein the log methods called with the identifier parameter are only processed if the group number associated with the identifier parameter is included in the string.

5. The method of claim 1, wherein determining the class and method further comprises:

determining a thread ID on which the log method was called; and using the thread ID to determine the class and method from which the log method was called.

6. The method of claim 1, further comprising:

writing the trace statements to a buffer; and periodically writing the trace statements from the buffer to the log file.

7. The method of claim 1, wherein the log method is processed by a thread executing the program and wherein the thread determines whether the variable indicates that the processed log method should be processed and the class and method from which the log method was called.

8. The method of claim 7, wherein the thread executing the program is executing in a first process, wherein the thread calls a second process separate from the first process, wherein the second process performs:

writing the trace statements to a buffer; and periodically writing the trace statements from the buffer to the log file.

9. The method of claim 7, wherein a first process in which the program is executed is capable of simultaneously processing multiple log methods called from multiple threads executing in the first process, wherein each thread in the first process is capable of separately determining the class and method for each of the multiple log methods that are processed.

10. The method of claim 1, wherein the program is object code generated from a Java source program.

11. A system for generating trace statements to a log file, comprising:

means for processing a log method in a program including an identifier parameter, wherein the program includes multiple instances of the log method to trace the execution of the program during debugging operations;

means for determining whether a variable indicates that log methods called with the identifier parameter should be processed;

means for determining a class and method from which the log method was called if the variable indicates that log methods called with the identifier parameter should be processed; and means for writing trace statements including information on the identifier parameter and determined class and method to the log file.

12. The system of claim 11, wherein the identifier indicates a component of the program from which the log method is called.

13. The system of claim 11, wherein the log method is called with a severity parameter indicating a purpose of the call.

14. The system of claim 11, further comprising:

means for processing group numbers packed by a power of two into a string to determine whether a group number associated with the identifier parameter is included in the string, wherein the log methods called with the identifier parameter are only processed if the group number associated with the identifier parameter is included in the string.

15. The system of claim 11, wherein the means for determining the class and method further comprises:

means for determining a thread ID on which the log method was called; and means for using the thread ID to determine the class and method from which the log method was called.

16. The system of claim 11, further comprising:

means for writing the trace statements to a buffer; and means for periodically writing the trace statements from the buffer to the log file.

17. The system of claim 11, wherein the log method is processed by a thread executing the program and wherein the thread comprises the means for determining whether the variable indicates that the processed log method should be processed and the class and method from which the log method was called.

18. The system of claim 17, wherein the thread executing the program is executing in a first process, wherein the thread calls a second process separate from the first process, wherein the second process includes:

means for writing the trace statements to a buffer; and means for periodically writing the trace statements from the buffer to the log file.

19. The system of claim 17, wherein a first process in which the program is executed is capable of simultaneously processing multiple log methods called from multiple threads executing in the first process, wherein each thread in the first process is capable of separately determining the class and method for each of the multiple log methods that are processed.

20. The system of claim 11, wherein the program is object code generated from a Java source program.

21. An article of manufacture for generating trace statements to a log file, wherein computer usable media includes at least one computer program that is capable of causing the computer system to perform:

processing a log method in a program including an identifier parameter, wherein the program includes multiple instances of the log method to trace the execution of the program during debugging operations;

determining whether a variable indicates that log methods called with the identifier parameter should be processed;

determining a class and method from which the log method was called if the variable indicates that log methods called with the identifier parameter should be processed; and writing trace statements including information on the identifier parameter and determined class and method to the log file.

22. The article of manufacture of claim 21, wherein the identifier indicates a component of the program from which the log method is called.

23. The article of manufacture of claim 21, wherein the log method is called with a severity parameter indicating a purpose of the call.

24. The article of manufacture of claim 21, further comprising:

processing group numbers packed by a power of two into a string to determine whether a group number associated with the identifier parameter is included in the string, wherein the log methods called with the identifier parameter are only processed if the group number associated with the identifier parameter is included in the string.

25. The article of manufacture of claim 21, wherein determining the class and method further comprises:

determining a thread ID on which the log method was called; and using the thread ID to determine the class and method from which the log method was called.

26. The article of manufacture of claim 21, further comprising:

writing the trace statements to a buffer; and periodically writing the trace statements from the buffer to the log file.

27. The article of manufacture of claim 21, wherein the log method is processed by a thread executing the program and wherein the thread determines whether the variable indicates that the processed log method should be processed and the class and method from which the log method was called.

28. The article of manufacture of claim 27, wherein the thread executing the program is executing in a first process, wherein the thread calls a second process separate from the first process, wherein the second process performs:

writing the trace statements to a buffer; and periodically writing the trace statements from the buffer to the log file.

29. The article of manufacture of claim 27, wherein a first process in which the program is executed is capable of simultaneously processing multiple log methods called from multiple threads executing in the first process, wherein each thread in the first process is capable of separately determining the class and method for each of the multiple log methods that are processed.

30. The article of manufacture of claim 21, wherein the program is object code generated from a Java source program.

\* \* \* \* \*